United States Patent [19]

Okada et al.

[11] 4,249,948
[45] Feb. 10, 1981

[54] ADDITIVE FOR AIR-ENTRAINED CONCRETE OR AIR-ENTRAINED MORTAR

[75] Inventors: Eisaburo Okada, Wakayama; Koji Sakagami, Kainan, both of Japan

[73] Assignee: Kao Soap Co., Ltd., Tokyo, Japan

[21] Appl. No.: 74,627

[22] Filed: Sep. 12, 1979

[30] Foreign Application Priority Data

Sep. 25, 1978 [JP] Japan .................................. 53-117682

[51] Int. Cl.$^3$ .............................................. C04B 21/00
[52] U.S. Cl. ........................................ 106/88; 106/90; 106/314

[58] Field of Search ...................... 106/88, 90, 86, 314

[56] References Cited

U.S. PATENT DOCUMENTS

| | | | |
|---|---|---|---|
| 3,926,650 | 12/1975 | Lange et al. | 106/88 |
| 4,125,410 | 11/1978 | Matsuume | 106/90 |

*Primary Examiner*—James Poer
*Attorney, Agent, or Firm*—Blanchard, Flynn, Thiel, Boutell & Tanis

[57] ABSTRACT

An additive for AE concrete or AE mortar which comprises an α-olefin-sulfonic acid salt.

10 Claims, No Drawings

ADDITIVE FOR AIR-ENTRAINED CONCRETE OR AIR-ENTRAINED MORTAR

The present invention relates to an additive for AE (air-entrained) concrete or AE mortar which comprises an α-olefin-sulfonic acid salt.

When there is added to a hydraulic cement composition an additive capable of imparting an air-entraining property to concrete or mortar (which additive is hereinafter referred to as "AE agent"), attainment of the following effects is expected:

(1) improvement of the workability and accompanying reduction of the water-cement ratio and the amount of fine aggregate in the composition;

(2) reduction of bleeding because of the increase of the water-retaining power of the air bubbles;

(3) improvement of the pumpability; and (4) improvement of the freezing-thawing resistance.

As the most popular principal ingredients of conventional AE agents, there can be mentioned anionic surface active agents such as highly oxidized resin acid salts, salts of protein substances, alkylbenzene sulfonate salts, triethanolamine salts of alkyl sulfonates and polyoxyethylene alkyl sulfonate salts, and nonionic surface active agents such as polyoxyethylene alkylaryl ethers. Furthermore, as the air-entraining water-reducing agent (hereinafter referred to as "AE water-reducing agent"), there can be mentioned lignin sulfonates and condensates of formaldehyde with aromatic hydrocarbon sulfonates, exemplified by sodium naphthalene sulfonate-formaldehyde high molecular weight condensates.

In the present invention, the term "AE concrete" and "AE mortar" means concrete and mortar, respectively, in which an AE agent or AE water-reducing agent is incorporated.

As typical examples of the conventional high range water-reducing agents for concrete, there can be mentioned high molecular weight condensates of formaldehyde with β-naphthalene-sulfonates, condensates of formaldehyde with sulfonated creosote oil petroleum decomposition products and sulfonates of melamine-formaldehyde condensates. Each of them possesses non-retarding and low foaming properties. The term "non-retarding" means that when the water-reducing agent is incorporated in concrete, the concrete becomes hardened within 24 hours. Furthermore, the term "low foaming" means that when the water-reducing agent is incorporated in concrete, the amount of entrained air is less than 3% by volume. In general, a water-reducing agent having a surface tension of 60 dyne/cm$^2$ or below at an amount of 2 g/liter can impart the low foaming property in the above meaning. Non-air-entraining, high range, water-reducing agents have heretofore been mainly used in the so-called high strength concrete products. AE agents or AE water-reducing agents have heretofore been used mainly for concrete for building construction or concrete having a relatively low strength. Therefore, a non-air-entraining, high range, water-reducing agent has rarely been used in combination with an AE agent.

Recently, in Germany, a sulfonate of formaldehydemelamine condensate, which is a high range water-reducing agent, has been used as a fluidizing agent for fluid concrete (Flissbeton). Furthermore, it has been found that a salt of high molecular weight condensate of formaldehyde with β-naphthalene-sulfonic acid, which is a high range water-reducing agent, is very excellent as a fluidizing agent. In the preparation of fluid concrete, it has been confirmed that the air entrained in the concrete, caused by the incorporation of an AE agent or AE reducing agent in the base concrete, i.e., concrete before the addition of a fluidizing agent, is defoamed when the above-mentioned fluidizing agent of the high range water-reducing agent type is added and hence, the intended effect can hardly be attained. Also in high strength prestressed concrete products, such as railroad ties, rail slabs and bridge girders which are exposed to atmospheric air and undergo freezing and thawing, high range water-reducing agents are often used in combination with AE agents, and also in such a case, the entrained air is defoamed. In short, even if a conventional, commercial, high range water-reducing agent is combined with a conventional commercial AE agent, it is impossible to prepare concrete in which both of the functions of both of the additives are satisfactorily exhibited, that is, there is not obtained concrete having both of the properties that (1) in the unhardened state the fluidity is remarkably high and (2) in the hardened concrete a sufficient air-entraining effect is maintained.

In connection with the freezing-thawing resistance, which is one of the important properties of AE concrete, ACI (American Concrete Institute) has proposed that the bubble spacing factor should be less than 250μ, preferably less than 200μ, and this coefficient is regarded as an important factor for the manufacture of AE concrete as well as the durability index of the freezing-thawing test.

When a commercial AE agent or AE reducing agent is used alone, the bubble spacing factor of the concrete is less than 200μ or slightly larger than 200μ, and the resistance to freezing-thawing is satisfactory. However, when such AE agent or AE water-reducing agent is used in combination with a high range water-reducing agent (fluidizing agent), even if it is used in an amount larger than the customary amount, the bubble spacing factor is larger than 250μ and the freezing-thawing resistance is reduced.

In view of this state of the art, we have completed research with a view toward developing an AE agent having a property such that even when it is used in combination with a high range water-reducing agent, it can provide concrete having a freezing-thawing resistance comparable to that of ordinary AE concrete and, also, a bubble spacing factor of less than 200μ. As a result, we have discovered that a special limited class of anionic surface active agents can satisfy this requirement sufficiently. Based on this finding, we have now completed the present invention.

More specifically, in accordance with the present invention, there is provided an additive for AE concrete or AE mortar which comprises an α-olefin-sulfonic acid salt.

The α-olefin that is used for obtaining the α-olefin-sulfonic acid salt according to the present invention is a compound having a double bond at the end of the molecule, i.e. at the α-position, and such olefins are ordinarily obtained by cracking of a petroleum fraction or by polymerization of ethylene. The α-olefin-sulfonic acid salt that is used in the present invention can be prepared by sulfonating such α-olefin with SO$_3$ gas, concentrated sulfuric acid or chlorosulfonic acid, and then hydrolyzing the sulfonation product. A sodium salt of an α-olefin-sulfonic acid having 12 to 18 carbon atoms is preferred as the α-olefin-sulfonic acid salt, according to the present invention. This salt is an excellent surface active agent and it exhibits an excellent function as an AE agent, and it can be used in combination with a high range water-reducing agent without degradation of its function as an AE agent. More specifically, the α-olefin-sulfonic acid salt is a good AE agent when it is used alone, and when it is used in combination with a high range water-reducing agent, it still exerts a satisfactory AE effect. When this salt is used for the preparation of concrete or mortar, the air-entraining property is remarkably improved. The fluidity of concrete or mortar before it is molded is enhanced and the resistance of the molded concrete to freezing-thawing cycles is remarkably increased. The α-olefin-sulfonic acid salt according to the invention includes, in addition to a sodium salt, salts of alkali metals, ammonium, alkali earth metals, lower amines such as methylamine and ethanolamine, and morpholine.

In the present invention, as the high range water-reducing agent for concrete, there are preferably employed high molecular weight condensates of formaldehyde with β-naphthalene-sulfonic acid, condensates of formaldehyde with sulfonated creosote oil petroleum decomposition products and sulfonated formaldehydemelamine condensates. In the present invention, the high condensate of formaldehyde with β-naphthalenesulfonic acid is a high molecular weight polymer obtained by condensing naphthalene-sulfonic acid with formaldehyde to such a high extent that the remaining amount of the unreacted naphthalene-sulfonic acid is less than 8 wt. %. The sulfonation product salt of formaldehyde-melamine condensate is a product obtained by condensing sulfonated melamine with formaldehyde to such an extent that the viscosity of an aqueous solution of the product having a solid concentration of 20 % by weight is 8 to 180 centipoises. The creosote oil petroleum decomposition products include acenaphthene, aromatic hydrocarbon mixtures such as creosote oil and petroleum cracked fractions.

For incorporation of the additive of the present invention into concrete or mortar, there can be used (1) a method in which the α-olefin-sulfonic acid salt is blended with the high range water-reducing agent, the mixture is dissolved in water and the solution is added to concrete or mortar, (2) a method in which the high range water-reducing agent and the α-olefin-sulfonic acid salt are separately dissolved in water and the respective solutions are added to concrete or mortar, or an aqueous solution containing the additives at a high concentration is prepared and added to concrete or mortar, and (3) a method in which dry solids of the high range water-reducing agent and α-olefin-sulfonic acid are incorporated into a cement admixture free of water (dry blending).

When the salt of the condensate of formaldehyde with β-naphthalene-sulfonic acid or the condensate of formaldehyde with a sulfonation product of a creosote oil petroleum decomposition product is used as the high range water-reducing agent, it is preferred that the α-olefin-sulfonic acid salt is used in an amount of 0.19 to 10 parts by weight, per 100 parts by weight of the water-reducing agent, and when the sulfonation product salt of melamine-formalin condensate is used as the high range water-reducing agent, it is preferred that the α-olefin-sulfonic acid salt is used in an amount of 0.095 to 5 parts by weight, per 100 parts by weight of the water-reducing agent.

The amount used of the AE additive of the present invention varies depending on the necessary amount of air, the required slump value, the kind and amount of cement and aggregate used, the mixing order, the kind of mixing machine used, the temperature and other factors, and it cannot be readily specified. In order to attain an air amount of 4.0±0.5 vol. % in concrete, according to the quality standard JASS5-401, for surface active agents for concrete specified by the Japanese Association of Construction, and an air amount of 4 to 4.5 vol. % in AE concrete according to the standard for AE concrete specified by the Japanese Association of Civil Engineering, it is preferred that (A) the α-olefin-sulfonic acid salt is incorporated in an amount of 0.002 to 0.015% by weight, based on the weight of the cement, and that (B) the high range water-reducing agent is incorporated in an amount of (B-1) 0.15 to 1.05% by weight, based on the weight of the cement, in the case of the high condensate formaldehyde β-naphthalene-sulfonic acid and the formaldehyde condensate of a sulfonation product of a creosote oil petroleum decomposition product, and (B-2) 0.3 to 2.1% by weight, based on the weight of the cement, in the case of the sulfonate of melamine-formaldehyde condensate.

By adjusting the amount of the α-olefin-sulfonic acid salt used, it is possible to attain a required air amount of 3 to 6 vol. % for reinforced concrete, according to the standard JASS5 specified by the Japanese Association of Construction, and an air amount of 3 to 6 vol. % for AE concrete according to the standard instructions of the Japanese Association of Civil Engineering.

In preparing concrete or mortar by using the additive of the present invention, the function of the high range water-reducing agent is fully exhibited, and the resulting AE concrete has a sufficient freezing-thawing resistance such that the relative dynamic modulus of elasticity is higher than 95% in 300 freezing-thawing cycles, and the bubble spacing factor is less than 200μ in many cases and it is less than 230μ in all cases and does not exceed the critical level of 250μ specified by ACI.

The properties of AE concrete prepared by using the additive of the present invention will now be described in detail by reference to the following illustrative Examples. In the Examples, the slump and air content of unhardened concrete were measured according to the methods of JIS A-1101 and JIS A-1128, respectively. The freezing-thawing resistance test and the bubble spacing factor measurement were carried out according to the method A of ASTM C-666 and the modified point count method of ASTM C-457. Samples for the freezing-thawing resistance test having a size of 10 cm×10 cm×40 cm were prepared according to JIS A-1132.

Great importance is attached to the results of the freezing-thawing resistance test in the present invention because we consider that the above-mentioned effects (1), (2) and (3) will be satisfactorily attained by AE concrete or AE mortar when concrete has a good resistance to freezing-thawing.

The materials used in the Examples were ordinary Portland cement (manufactured by Onoda Cement), fine aggregate (sand produced at Kinokawa, specific gravity=2.60, FM=2.72), coarse aggregate (pulverized stone produced at Takarazuka, specific gravity=2.62, maximum size=20 mm, FM=6.84), and a commercially available salt of a high condensate of formaldehyde with β-naphthalene-sulfonic acid (Mightly 150 manufactured and sold by Kao Soap K.

K.) or commercially available sulfonation product salt of formaldehyde-melamine condensate (Melment F10 manufactured by Showa Denko K.K.) as the high range water-reducing agent.

EXAMPLES

The concrete composition used is shown in Table 1.

TABLE 1

| Composition Used in Examples and Comparisons | | | | | |
|---|---|---|---|---|---|
| W/C (%) | S/A (%) | Amounts (Kg/m³ of concrete) | | | |
| | | C | W | S | G |
| 54.3 | 40 | 300 | 163 | 717 | 1079 |

Mixing was carried out for 3 minutes by a forced stirring mixer having a capacity of 50 liters.

In Table 1, "W" is water, "C" is cement, "S" is fine aggregate, "G" is coarse aggregate, and "A" is the sum of "S" and "G".

The results of the tests made on concrete are shown in Table 2.

The properties shown in Table 2 were determined according to the following methods. Freezing-thawing resistance test:

The concrete sample was subjected to repeated high speed repeated freezing-thawing cycles (between +5° C. and −18° C.) in water in a laboratory (the time for one freezing-thawing cycle being 3 hours), and the quality change of the concrete was examined according to the fundamental transverse frequency test.

The freezing-thawing resistance is ordinarily evaluated based on the relative dynamic modulus of elasticity represented by the following formula, and a value closer to 100 indicates a better resistance:

$$Pc = (n_1^2/n^2) \times 100$$

wherein Pc is the relative dynamic modulus (%) of elasticity after "c" cycles of freezing-thawing, $n_1$ is the primary bending vibration frequency before the freezing-thawing test, and n is the primary bending vibration frequency after "c" cycles of freezing-thawing.

Bubble spacing factor:

The bubble spacing factor is used as an index indicating the average distribution state of bubbles of air en-

TABLE 2

Test Results

| Run No. | High Range Water-Reducing Agent | | Surface Active Agent | | Air Amount (%) | Slump (cm) | Bubble Spacing Factor (μ) | Relative Dynamic Modulus (%) of Elasticity at 300 Cycles |
|---|---|---|---|---|---|---|---|---|
| | Kind | Amount | Kind | Amount | | | | |
| Comparison 1 | — | 0.0 | — | 0.0 | 1.0 | 3.3 | 973 | broken before 50 cycles |
| Comparison 2 | Mighty 150 | 0.25 | — | 0.0 | 1.4 | 10.0 | 1109 | broken before 50 cycles |
| Comparison 3 | Melment F10 | 0.52 | — | 0.0 | 1.0 | 9.4 | 954 | broken before 50 cycles |
| Comparison 4 | — | 0.0 | A | 0.0054 | 3.7 | 4.5 | 162 | 100 |
| Comparison 5 | — | 0.0 | B | 0.0013 | 4.4 | 5.7 | 124 | 98 |
| Comparison 6 | — | 0.0 | C | 0.0018 | 4.0 | 7.0 | 147 | 96 |
| Comparison 7 | — | 0.0 | D | 0.02 | 3.8 | 7.0 | 446 | broken before 50 cycles |
| Comparison 8 | — | 0.0 | E | 0.0021 | 4.0 | 5.4 | 160 | 98 |
| Comparison 9 | — | 0.0 | F | 0.0009 | 3.9 | 6.5 | 199 | 98 |
| Comparison 10 | Mighty 150 | 0.25 | A | 0.0072 | 4.0 | 13.0 | 244 | 94 |
| Comparison 11 | Mighty 150 | 0.25 | B | 0.0042 | 4.2 | 10.2 | 363 | 92 |
| Comparison 12 | Mighty 150 | 0.25 | C | 0.0075 | 3.9 | 10.7 | 353 | 83 |
| Comparison 13 | Mighty 150 | 0.25 | D | 0.035 | 4.5 | 13.4 | 351 | broken before 50 cycles |
| Comparison 14 | Mighty 150 | 0.25 | E | 0.0051 | 3.9 | 6.6 | 225 | 92 |
| Comparison 15 | Mighty 150 | 0.25 | F | 0.0024 | 3.7 | 10.3 | 306 | 92 |
| Example 1 | — | 0.0 | S1 | 0.0046 | 4.5 | 8.6 | 152 | 99 |
| Example 2 | Mighty 150 | 0.25 | S1 | 0.0073 | 4.4 | 10.5 | 193 | 95 |
| Example 3 | — | 0.0 | S2 | 0.0041 | 4.0 | 8.8 | 165 | 100 |
| Example 4 | Mighty 150 | 0.25 | S2 | 0.0086 | 4.1 | 12.5 | 211 | 96 |
| Example 5 | Melment F10 | 0.52 | S1 | 0.0066 | 4.4 | 11.5 | 183 | 95 |

Note
(1) The amount of the additive is expressed in terms of the % by weight of the solids based on the weight of the cement.
(2) Abbreviations for the surface active agents are as follows:
A: neutral salt of highly oxidized natural resin acid
B: sodium alkylbenzene sulfonate
C: sodium polyoxyethylene alkylphenyl sulfate
D: polyoxyethylene alkylaryl ether
E: triethanolamine lauryl sulfate
F: sodium lauryl sulfate
S1: sodium α-olefin-sulfonate (mixture of $C_{16}$ and $C_{18}$ olefins)
S2: sodium α-olefin-sulfonate ($C_{12-18}$ mixture)

trained in the concrete. There are various methods for determination of this factor. In the Examples, the modified point count method was adopted. More specifically, the well-polished concrete surface was linearly traversed by a microscope and the number of bubbles was counted. The bubble spacing factor ($\bar{L}$) is calculated according to the following equation:

$$\bar{L} = 3/\alpha[1.4(P/A+1)^{\frac{1}{3}} - 1]$$

wherein $\bar{L}$ is the bubble spacing factor, P is the paste amount in concrete (calculated from the composition), A is the amount of air in the hardened structure, which is calculated according to the formula $A = 100Ss/St$, in which Ss is the total number of stop points (measured value) where the index point is in agreement with the bubble section and St is the number (measured value) of the total stop points during the traverse, and $\alpha$ is the bubble surface area, which is represented by the formula $\alpha = 4/\bar{l}$ in which $\bar{l}$ is the average chord length of the bubbles, which is represented by the formula $\bar{l} = A/100n$ in which A is as defined above and n is the average number of bubbles traversed per unit length, which is represented by the formula $n = N/T$ in which T is the total number (measured value) of the bubble sections traversed and N is the entire traverse length (measured value). From the results of Comparisons 1 to 3, it is apparent that when no additive is added or when only a high range water-reducing agent is added, the concrete has no substantial resistance to freezing-thawing.

In Comparisons 4 to 6, 8 and 9, the results obtained by using a commercially available AE agent alone are shown. From the results obtained in Comparisons 10 to 12, 14 and 15, it is apparent that when Mighty 150 is used in combination with such a commercially available AE agent, the performance of the commercially available AE agent is reduced.

From the results of Examples 2, 4 and 5, it will readily be understood that even when the α-olfein-sulfonic acid salt of the present invention is used in combination with a high range water-reducing agent and the bubble spacing factor is about 200μ, the relative dynamic modulus of elasticity at 300 cycles is higher than 95%, and therefore, very excellent AE concrete can be prepared. Furthermore, the results of Examples 1 and 3 demonstrate that even when the α-olefin-sulfonic acid salt of the present invention is used alone, a good AE concrete can be prepared.

The results of Comparisons 7 and 13 indicate that the surface active agent D is not an effective AE agent.

The embodiments of the invention in which an exclusive property or privilege is claimed are defined as follows:

1. In a hydraulic cement composition for making concrete or mortar, comprising hydraulic cement, water and, optionally, aggregate, the improvement which comprises: said composition contains (A) an effective amount of α-olefin sulfonate for entraining air in said composition and (B) an effective amount of water-reducing agent selected from the group consisting of (1) condensate of formaldehyde with sulfonated creosote oil petroleum decomposition product, (2) high molecular weight condensate of formaldehyde with β-naphthalene sulfonic acid and (3) high molecular weight condensate of formaldehyde with sulfonated melamine, with the provisos that when said water-reducing agent (B) is (1) or (2), the weight ratio of A/B is in the range of from 0.19/100 to 10/100, and when said water-reducing agent (B) is (3), the weight ratio of A/B is in the range of from 0.095/100 to 5/100.

2. A hydraulic cement composition as claimed in claim 1 in which said α-olefin sulfonate is sodium α-olefin sulfonate having from 12 to 18 carbon atoms.

3. A hydraulic cement composition as claimed in claim 1 or claim 5 in which the amount of said α-olefin sulfonate is from 0.002 to 0.015% by weight, based on the weight of said hydraulic cement, said water-reducing agent is said condensate of formaldehyde with sulfonated creosote oil petroleum decomposition product and the amount of said water-reducing agent is 0.15 to 1.05% by weight, based on the weight of said hydraulic cement.

4. A hydraulic cement composition as claimed in claim 1 or claim 2 in which the amount of said α-olefin sulfonate is from 0.002 to 0.015% by weight, based on the weight of said hydraulic cement, said water-reducing agent is said high molecular weight condensate of formaldehyde with β-naphthalene sulfonic acid and the amount of said water-reducing agent is 0.15 to 1.05% by weight, based on the weight of said hydraulic cement.

5. A hydraulic cement composition as claimed in claim 1 or claim 2 in which the amount of said α-olefin sulfonate is from 0.002 to 0.015% by weight, based on the weight of said hydraulic cement, said water-reducing agent is said high molecular weight condensate of formaldehyde with sulfonated melamine and the amount of said water-reducing agent is 0.3 to 2.1% by weight, based on the weight of said hydraulic cement.

6. An additive for a hydraulic cement composition which consists essentially of: (A) α-olefin sulfonate and (B) water-reducing agent selected from the group consisting of condensate of formaldehyde with sulfonated creosote oil petroleum decomposition product and high molecular weight condensate of formaldehyde with β-naphthalene sulfonic acid, the weight ratio of A:B being in the range of 0.19:100 to 10:100.

7. An additive for a hydraulic cement composition as claimed in claim 6 in which said α-olefin sulfonate is sodium α-olefin sulfonate having from 12 to 18 carbon atoms.

8. An additive for a hydraulic cement composition which consists essentially of: (A) α-olefin sulfonate and (B) high molecular weight condensate of formaldehyde with sulfonated melamine, the weight ratio of A:B being in the range of 0.095:100 to 5:100.

9. An additive for a hydraulic cement composition as claimed in claim 8 in which said α-olefin sulfonate is sodium α-olefin sulfonate having from 12 to 18 carbon atoms.

10. A method for preparing an air-entrained concrete or mortar, which comprises the steps of: blending in a cementitious composition comprising hydraulic cement and an amount of water effective to harden said hydraulic cement, (A) from 0.002 to 0.15% by weight, based on the weight of said hydraulic cement, of sodium α-olefin sulfonate having from 12 to 18 carbon atoms, and (B) water-reducing agent selected from the group consisting of (1) from 0.15 to 1.0% by weight, based on the weight of said hydraulic cement, of condensate of formaldehyde with sulfonated creosote oil petroleum decomposition product, (2) from 0.15 to 1.0% by weight, based on the weight of said hydraulic cement of high molecular weight condensate of formaldehyde with β-naphthalene sulfonic acid, and (3) from 0.3 to 2.1% by weight, based on the weight of said hydraulic cement, of condensate of formaldehyde with sulfonated melamine, with the provisos that when said water-reducing agent (B) is (1) or (2), the weight ratio of A/B is in the range of from 0.19/100 to 10/100, and when said water-reducing agent (B) is (3), the weight ratio of A/B is in the range of from 0.095/100 to 5/100, and agitating said composition to incorporate air bubbles therein; and then hardening the composition.

* * * * *

UNITED STATES PATENT OFFICE
CERTIFICATE OF CORRECTION

Patent No. 4 249 948    Dated February 10, 1981

Inventor(s)  Eisaburo Okada et al

It is certified that error appears in the above-identified patent and that said Letters Patent are hereby corrected as shown below:

Column 8, line 7; change "claim 5" to ---claim 2---.

Signed and Sealed this

Fifth Day of May 1981

[SEAL]

Attest:

RENE D. TEGTMEYER

Attesting Officer    Acting Commissioner of Patents and Trademarks